United States Patent
Fujimoto

(10) Patent No.: US 7,440,014 B2
(45) Date of Patent: Oct. 21, 2008

(54) ELECTRONIC CAMERA WITH BASIC OPERATING CLOCK FREQUENCY CHANGE BASED ON PHOTOGRAPHY MODE

(75) Inventor: Shinichi Fujimoto, Asaka (JP)

(73) Assignee: Fujifilm Corporation, Minato-ku, Tokyo (JP)

( * ) Notice: Subject to any disclaimer, the term of this patent is extended or adjusted under 35 U.S.C. 154(b) by 812 days.

(21) Appl. No.: 10/781,784

(22) Filed: Feb. 20, 2004

(65) Prior Publication Data

US 2004/0169738 A1 Sep. 2, 2004

(30) Foreign Application Priority Data

Feb. 28, 2003 (JP) .............................. 2003-053244

(51) Int. Cl.
*H04N 5/217* (2006.01)
*H04N 5/335* (2006.01)
(52) U.S. Cl. ....................................... 348/241; 348/312
(58) Field of Classification Search ................. 348/241, 348/248, 249, 250, 312, 231.99
See application file for complete search history.

(56) References Cited

U.S. PATENT DOCUMENTS

| | | | | | |
|---|---|---|---|---|---|
| 5,343,243 | A | * | 8/1994 | Maeda | 348/222.1 |
| 5,502,578 | A | * | 3/1996 | Smitt | 358/474 |
| 5,838,373 | A | * | 11/1998 | Hasegawa et al. | 348/312 |
| 6,870,566 | B1 | * | 3/2005 | Koide et al. | 348/296 |

FOREIGN PATENT DOCUMENTS

JP 10-13799 1/1998

* cited by examiner

*Primary Examiner*—David Ometz
*Assistant Examiner*—Nicholas G Giles
(74) *Attorney, Agent, or Firm*—McGinn IP Law Group, PLLC

(57) ABSTRACT

An electronic camera in which an analog signal output from a CCD image sensor is AD-converted and digital processing is performed on the AD-converted by an A/D converter in an analog front end, and the AD-converted signal DMA-transferred to a RAM through line memories in a signal processor. The signal processor controls a basic operating clock signal generated from a clock signal generation circuit so that the frequency of the clock signal is reduced during a read period in which processing including AD conversion of the analog signal output from the CCD image sensor is performed.

17 Claims, 10 Drawing Sheets

VERTICAL STREAKS DUE TO NOISE

ELECTRONIC CAMERA WITH BASIC OPERATING CLOCK FREQUENCY CHANGE BASED ON PHOTOGRAPHY MODE

BACKGROUND OF THE INVENTION

1. Field of the Invention

The present invention relates to an electronic camera and, more particularly, to a technique for reducing noise contained in a still image.

2. Description of the Related Art

In this kind of electronic camera, a writing operation is performed in such a manner that an analog signal output from an image sensor at the time of still image photography is AD-converted and the AD-converted digital signal is written to a random access memory (RAM).

Japanese Patent Application Publication No. 10-13799 discloses an image reader designed so that the frequency of the basic operating clock signal is reduced except during photography and accompanying processing in order to reduce wasted electric power.

Ordinarily, electric power consumed for writing a large amount of data in the form of a digital signal to a RAM is large. A noise source is therefore produced at the time of writing and noise is mixed in the analog signal output from the image sensor, resulting in degradation in image quality. This problem is serious when the level of the analog signal output from the image sensor is low (that is, when the subject is dark).

Also, a direct memory access (DMA) transfer method is ordinarily used to write an AD-converted signal to a RAM with efficiency. If noise is mixed in the analog signal during DMA transfer, several vertical streaks appear in the entire image and image degradation become easily recognizable, as shown in FIG. 12. In this case, the influence of noise is increased.

The invention disclosed in Japanese Patent Application Publication No. 10-13799 has the effect of reducing electric power by reducing the frequency of the basic operating clock signal except during photography and accompanying processing, but has a problem that the image quality is affected by noise from a power supply section during photography as in the above-described case since the camera is operating on the high-frequency basic operating clock signal during photography.

In recent years, the development of image sensors having higher resolution has been pursued. It is a common practice to increase the frequency of the basic operating clock signal in order to increase the speed of digital processing for signal readout from a high-resolution image sensor. In such a case, however, a captured image is affected by noise due to an increase in the frequency of the basic operating clock signal.

SUMMARY OF THE INVENTION

In view of the above-described circumstances, an object of the present invention is to provide an electronic camera capable of avoiding or reducing the influence of noise on a photographed still image while minimizing the reduction in the processing capacity for image processing or the like.

To achieve the above-described object, the present invention provides an electronic camera in which an analog signal output from an image pickup device is AD-converted and digital processing is performed on the AD-converted signal on the basis of a basic operating clock, the camera having clock change device of changing the frequency of the basic operating clock, and control device of controlling the clock change device so that the frequency of the basic operating clock is reduced at the time of AD conversion of a still image output from the image pickup device.

That is, in the process of AD-converting the analog signal output from the image pickup device, noise relating to the basic operating clock is mixed in the analog signal. There is a need to AD-convert the analog signal in which noise is mixed by sampling a low-noise portion of the analog signal for each pixel. However, when the frequency of the basic operating clock is high, noise is mixed through the entire portion of the analog signal corresponding to one pixel. At the time of AD conversion of a still image output, therefore, the frequency of the basic operating clock is reduced to enable sampling of a low-noise portion or a portion in which noise is sufficiently attenuated in the analog signal for each pixel in which noise is mixed, and AD conversion of the sampled portion. When the frequency of the basic operating clock is reduced, the image throughput is reduced. However, the reduction in throughput is minimized by maintaining the frequency of the basic operating clock high except during AD conversion of the still image output from the image pickup device.

The electronic camera of the present invention may have photometry device of measuring the brightness of a subject, and the control device may control the clock change device so that the frequency of the basic operating clock is reduced when it is determined that the brightness of the subject measured by the photometry device is lower than a predetermined brightness.

That is, noise mixed in the analog signal output from the image pickup device is considerably large when the level of the analog signal is low (in the case of photography of a dark subject). Therefore, the frequency of the basic operating clock is reduced only at the time of photography of a dark subject. The frequency of the basic operating clock is reduced with respect to only a dark subject from which an image seriously affected by noise may result. Thus, the throughput is maintained in ordinary cases other than the case of photography of a dark subject.

The electronic camera of the present invention may have photography mode selecting device of selecting a desired photography mode from a plurality of photography modes, and the control device may control the clock change device so that the frequency of the basic operating clock is reduced only when a particular one of the photography modes is selected by the photography mode selecting device.

For example, the plurality of photography modes are a figure subject mode, a night scene mode and a sport mode and a continuous shooting mode. Any of the plurality of photography modes can be selected by user operating the photography mode selecting device. The frequency of the basic operating clock is reduced only when a particular one of these photography modes in which noise is easily visually recognizable (e.g., the figure subject mode or the night scene mode).

The electronic camera of the present invention may have ISO speed setting device of setting an ISO speed, and the control device may control the clock change device so that the frequency of the basic operating clock is reduced when the ISO speed set by the ISO speed setting device is equal to or higher than a predetermined value When the ISO speed is equal to or higher than a predetermined value (e.g., ISO 800) in an electronic camera in which the ISO speed can be set by a user or can be automatically set, the frequency of the basic operating clock is reduced to prevent mixing of noise or reduce the amount of noise mixed in a still image in a high speed mode in which noise is easily visually recognizable.

The electronic camera of the present invention may have first and second line memories in which the AD-converted digital signal is alternately stored in a predetermined data amount, and a RAM for temporarily storing the digital signal at least for one frame of a still image. When capture of the digital signal in the first line memory is completed, the captured digital signal may be DMA-transferred to the RAM on the basis of the basic operating clock. When capture of the digital signal in the second line memory is completed, the captured digital signal is DMA-transferred to the RAM on the basis of the basic operating clock signal.

In this aspect, the electronic camera uses a DMA transfer system in order to efficiently write the AD-converted digital signal to the RAM. That is, the AD-converted digital signal is captured alternately in the first line memory and the second line memory. When capture of the digital signal in one of the two line memories is completed, the captured digital signal is DMA-transferred to the RAM on the basis of the basic operating clock, and capture of the digital signal in the other line memory is started. In the case where the digital signal is written to the RAM by using the above-mentioned DMA transfer system, electric power change noise at the time of DMA transfer is mixed in the analog signal from the image pickup device. In particular, noise is mixed in certain portions in each image line to form noticeable vertical streaks since the DMA transfer timing is generally constant with respect to each line of the image pickup device. In this aspect of the present invention, however, occurrence of this kind of vertical streak is prevented or vertical streaks are made unnoticeable.

According to the present invention, as described above, the frequency of the basic operating clock is reduced at the time of AD conversion of the still image output from the image pickup device to avoid or reduce the influence of noise on a photographed still image. Since the time period for AD conversion of the still image output is short and since the frequency of the basic operating clock is maintained at a high frequency except during this AD conversion period, the reduction in throughput with respect to image processing or the like can be minimized. Further, since the frequency of the basic operating clock is reduced only at the time of particular still image photography, e.g., photography of a dark subject from which an image considerably affected by noise may result, the throughput can be maintained high in ordinary cases of still image photography other than the case of such particular still image photography.

DETAILED DESCRIPTION OF THE PREFERRED EMBODIMENTS

Preferred embodiments of an electronic camera in accordance with the present invention will be described with reference to the accompanying drawings.

Figure 1:
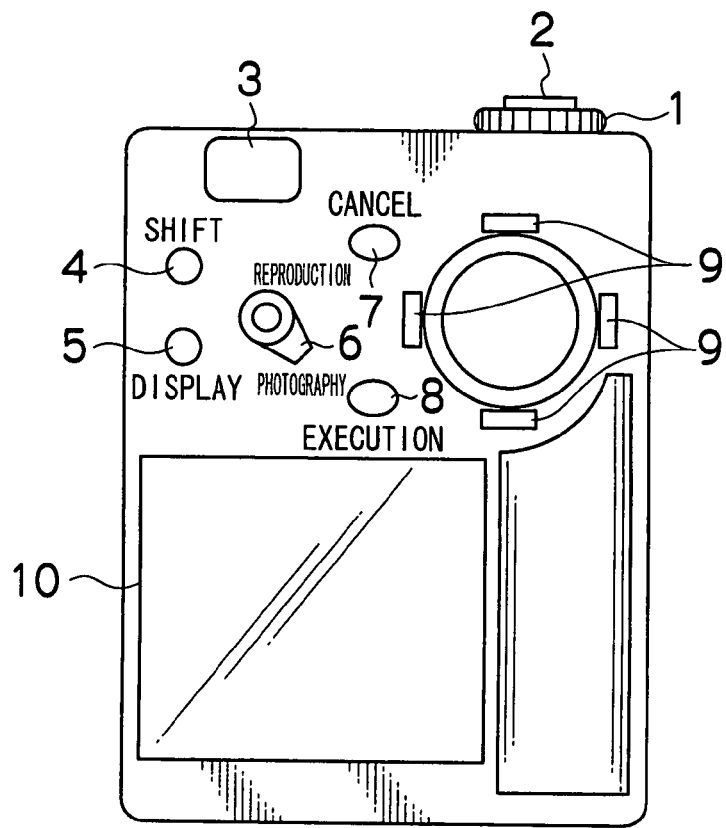
FIG. 1 is a rear view of an electronic camera in accordance with the present invention.
Figure 2:
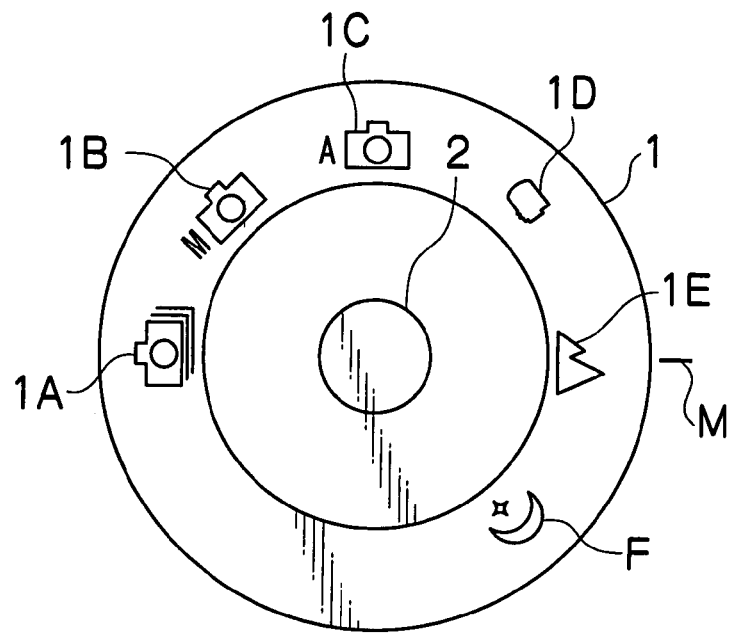
FIG. 2 is a plan view of a mode dial provided on an upper surface of the electronic camera shown in FIG. 1.

FIG. 1 is a rear view of an electronic camera in accordance with the present invention, and FIG. 2 is a plan view of a mode dial provided on an upper surface of the camera.

This electronic camera has, on its rear side, as shown in FIG. 1, a finder ocular portion 3, a shift key 4, a display key 5, a photography mode/production mode selecting lever 6, a cancel key 7, an execution key 8 for producing a menu display, executing a selected operation, etc., a multifunctional crisscross key 9 for zooming, making a selection from items in the medium display and inputting instructions, e.g., an instruction to frame feed, and a liquid crystal display (LCD) monitor 10.

As shown in FIG. 2, a mode dial 1 is rotated to position one of icons 1A to 1F on the dial in correspondence with a mark M, thereby setting one of photography modes: a continuous shooting mode, a manual photography mode, an automatic photography mode, a figure subject mode, a landscape mode and a night scene mode. FIG. 2 shows a state where the landscape mode is set. At a center of the mode dial 1, a shutter button 2 is provided for a switch S1 which is turned on when half pressed and a switch S2 which is turned on when fully pressed.

Figure 3:
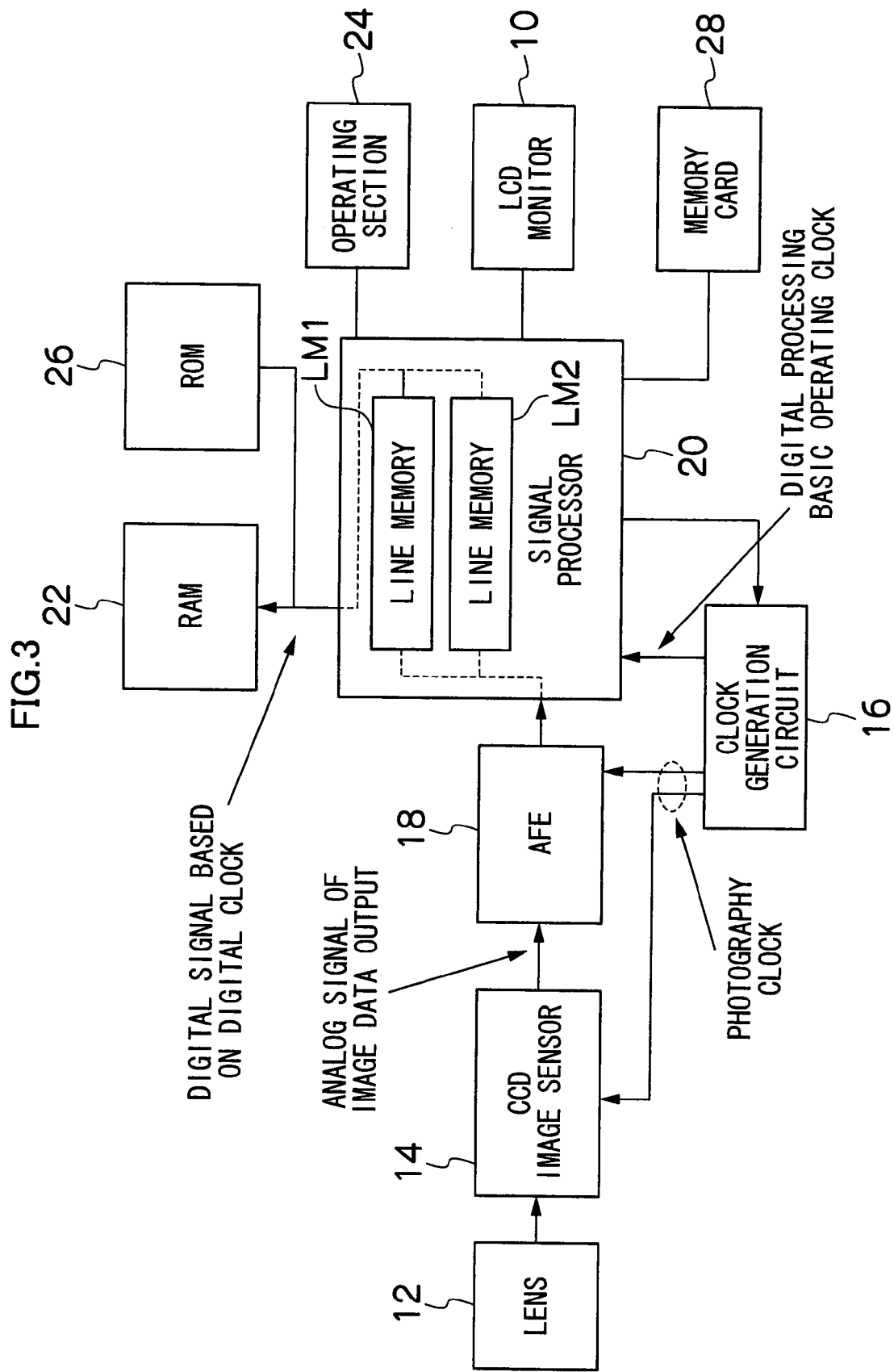
FIG. 3 is a block diagram showing the internal configuration of the electronic camera shown in FIG. 1.

FIG. 3 is a block diagram showing the internal configuration of the electronic camera shown in FIG. 1.

Referring to FIG. 3, a subject image imaged on a light receiving surface of an image pickup device (e.g., a CCD image sensor) 14 through a picture-taking lens 12 is converted into signal charge according to the incident amount of light by each sensor element. Signal charges thus accumulated are successively read out as an analog signal (CCD output) according to the signal charges on the basis of a photography clock signal supplied from a clock signal generation circuit 16.

Figure 4:
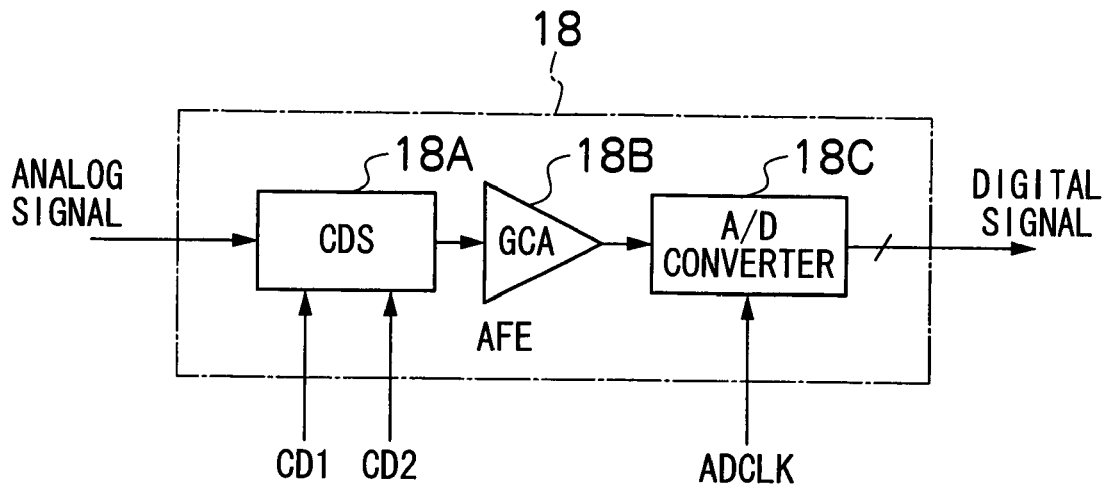
FIG. 4 is a block diagram showing the internal circuit of an analog front end (AFE)

The analog signal sequentially read out from the CCD image sensor 14 is supplied to an analog front end (AFE) 18. The AFE 18 includes, as shown in FIG. 4, a correlation double sampling (CDS) circuit 18A, an amplifier 18B and an A/D converter 18C. The CDS circuit 18A performs correlation double sampling processing on the input analog signal on the basis of sampling pulses supplied from the clock signal generation circuit 16. That is, the CDS circuit 18A extracts only image signal components from the analog signal (see FIG. 7F) input from the CCD image sensor 14 by performing correlation double sampling on the basis of sampling pulses DS1 and DS2.

The signal processed by the CDS circuit 18A is gain-controlled by the amplifier 18B and is thereafter supplied to the A/D converter 18C. The A/D converter 18C converts the input signal into a digital signal on a pixel-by-pixel basis on the basis of an AD clock signal supplied from the clock signal generation circuit 16.

Figure 7:
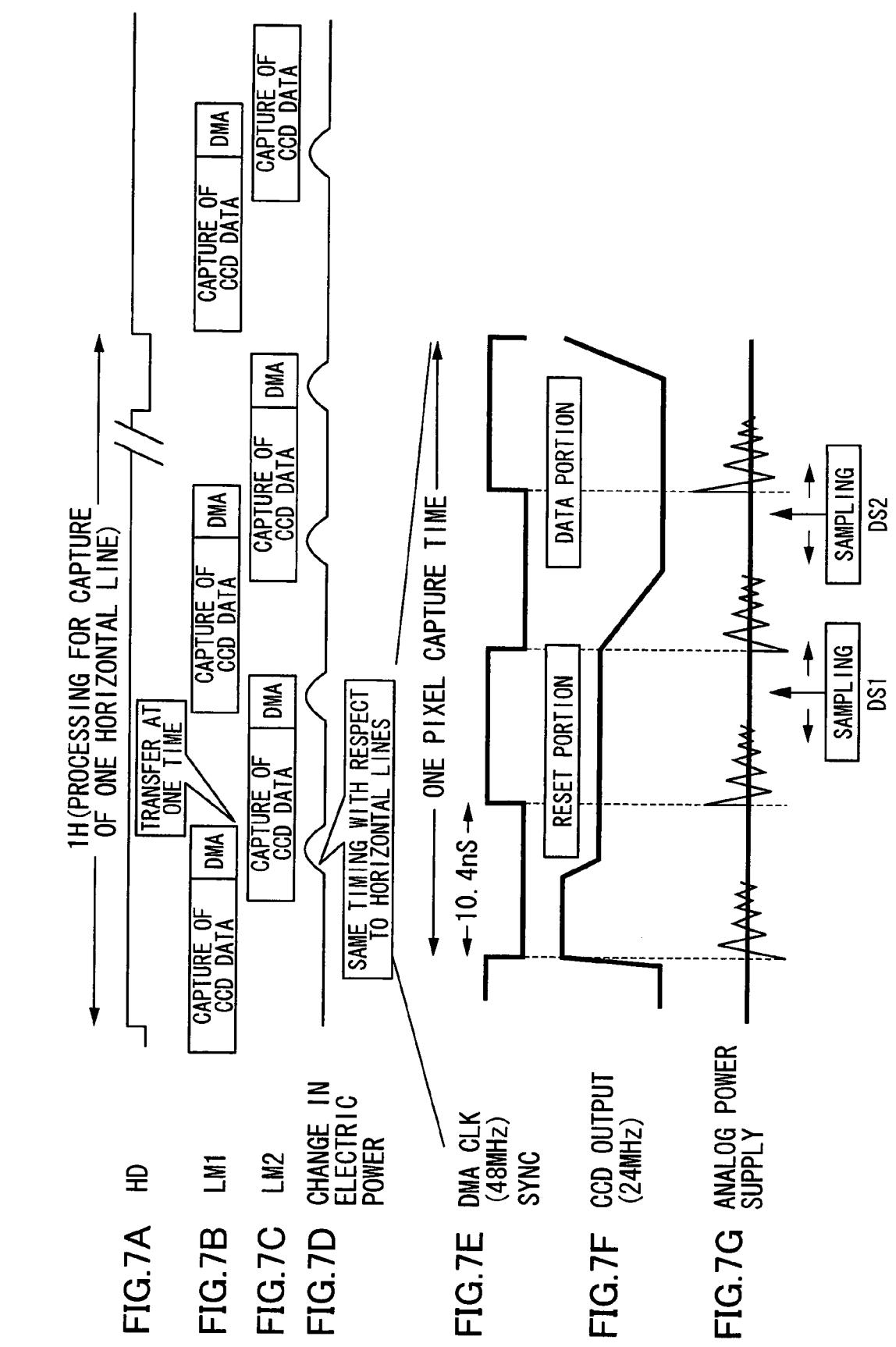
FIGS. 7A to 7G are timing charts showing signal waveforms in various sections at the time of processing for capturing the CCD output in a state where the frequency of the basic operating clock signal is low.

The digital signal processed by preprocessing including analog processing and A/D conversion in the AFE 18 is captured alternately in line memories LM1 and LM2 in a signal processor 20 constituted by a large-scale integrated circuit (LSI) (see FIGS. 7B and 7C). The line memories LM1 and LM2 are memories for a queue of the digital signal waiting for DMA transfer to a RAM 22. The number of digital signal pixel portions which can be captured at a time is smaller than the number of pixels corresponding to one line of the CCD image sensor 14 because of a restriction on the size of the LSI. During one horizontal period (IH) DMA transfer from the line memory LM1 and DMA transfer from LM2 are alternately repeated (see FIGS. 7A to 7C).

That is, the digital signal output from the AFE 18 is captured in the line memory LM1 and, when capture in the line memory LM1 is completed, the captured digital signal is DMA-transferred to the RAM 22 and the digital signal output from the AFE 18 is captured in the line memory LM2. When capture of the digital signal in the line memory LM2 is completed, the captured digital signal is DMA-transferred to the RAM 22 and the digital signal output from the AFE 18 is again captured in the line memory LM1.

The signal processor 20 performs centralized control on the circuits on the basis of inputs from an operating section 24 including the mode dial 1, the shutter button 2 and the photography mode/reproduction mode selecting lever 6 shown in FIG. 1. The signal processor 20 reads necessary programs from a ROM 26 in which a camera control program, etc., are stored, and executes various kinds of operation on the basis of the programs.

That is, the signal processor 20 performs various kinds of digital processing including white balancing, gamma correction, YC processing and compression processing on the digital signal captured in the RAM 22 as described above in correspondence with all the lines (the entire frame) of the CCD image sensor 14 when still image photography in the photography mode is performed. The signal processor 20 thereby forms image data compressed in a predetermined format and records the image data in a memory card 28. At the time of operation in the reproduction mode, the signal processor 20 performs expansion processing on the image data stored in the memory card 28, and then outputs the processed data to the LCD monitor 10 to display a reproduced image. Digital processing in the signal processor 20 is performed on the basis of a basic operating clock signal supplied from the clock signal generation circuit 16.

In addition, signal processor 20 controls the frequency of the basic operating clock signal generated from the clock signal generation circuit 16 at the time of AD conversion of the still image output from the CCD image sensor 14.

Figure 5:
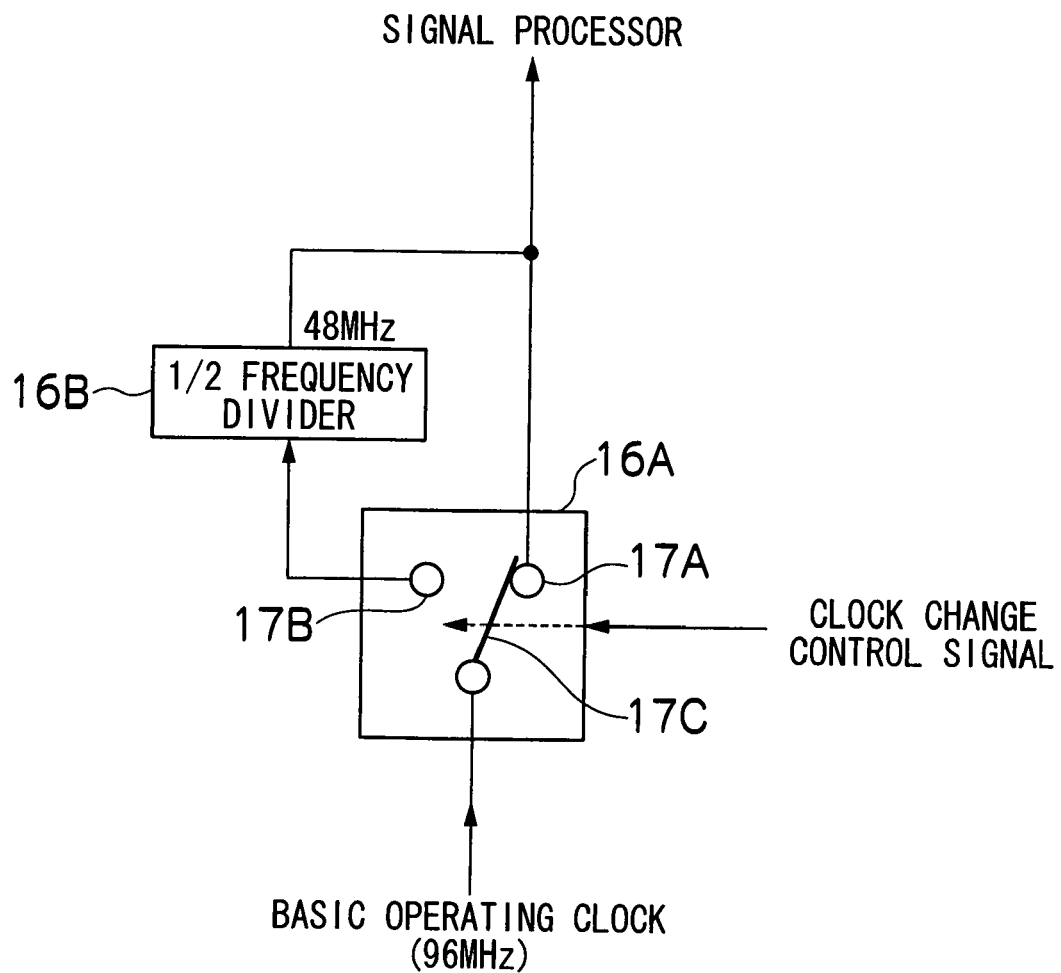
FIG. 5 is a diagram showing a section for changing a basic operating clock signal from a clock signal generation circuit.

FIG. 5 is a block diagram showing an essential portion of the clock signal generation circuit 16. As shown in FIG. 5, the clock signal generation circuit 16 is provided with a clock change switch 16A and a ½ frequency divider 16B. The basic operating clock signal having a frequency of 96 MHz is applied to the clock change switch 16A.

The signal processor 20 ordinarily outputs a clock change control signal of L level to connect a contact 17C of the clock change switch 16A to a contact 17A of this switch. The 96 MHz basic operating clock signal supplied to the clock change switch 16A is thereby input directly. At the time of AD conversion of the still image output from the CCD image sensor 14, the signal processor 20 outputs a clock change control signal of H level to the clock change switch 16A to connect the contact 17C of the clock change switch 16A to a contact 17B of this switch. The 96 MHz basic operating clock signal supplied to the clock change switch 16A is thereby supplied to the ½ frequency divider 16B. The frequency of the clock signal is reduced to ½ by the ½ frequency divider 16B to obtain a 48 MHz basic operating clock signal to be output to the signal processor 20.

In this embodiment, the clock change circuit 16A and the ½ frequency divider 16B are provided in the clock signal generation circuit 16. Alternatively, the clock change circuit 16A and the ½ frequency divider 16B may be provided in the signal processor 20. The frequency of the basic operating clock signal is not limited to this embodiment.

Control of change of the above-described basic operating clock signal will be described with reference to the timing chart of FIGS. 6A to 6E.

Figure 6:
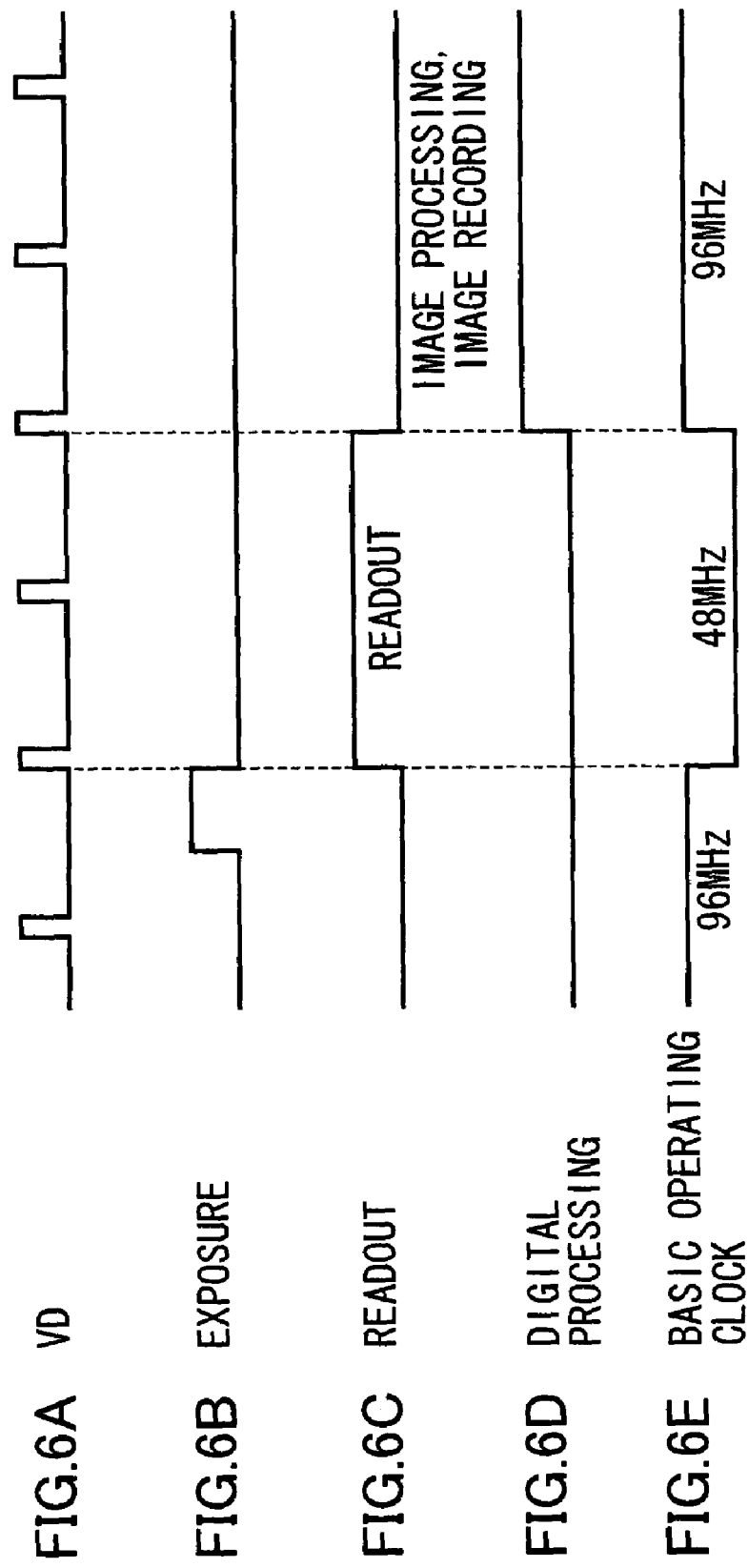
FIGS. 6A to 6E are timing charts for explaining control of change of the frequency of the basic operating clock signal.

When the shutter button 2 is fully pressed, the charge accumulation start time point (exposure start time point) is controlled with an electronic shutter according to the subject brightness measured at the time of half pressing of the shutter button 2 on the basis of a vertical sync signal VD (FIG. 6A), and exposure control is thereby performed (FIG. 6B).

After the completion of exposure, readout of the CCD output from the CCD image sensor 14 is performed during two periods (1/30 second) of vertical sync signal VD. The CCD output is A/D-converted and captured in the RAM 22 as described above (FIG. 6C). The digital signal captured in the RAM 22 undergoes various kinds of digital processing in the signal processor 20 and is thereafter recorded in the memory card 28 (FIG. 6D).

In the above-described processing sequence, the basic operating clock signal is changed so that its frequency is reduced to 48 MHz during the period for readout of the CCD output from the CCD image sensor 14, and is 96 MHz in the other ordinary period, as shown in FIG. 6E.

The effect of changing the frequency of the basic operating clock signal will now be described.

FIG. 7E shows the state of the basic operating clock signal having the frequency reduced to 48 MHz. In this state, the time period from a fall to a rise or from a rise to a fall of the basic operating clock signal (half clock period) is 10.4 ns.

The digital signal captured in the line memory LM1 or LM2 is DMA-transferred to the RAM 22 according to a predetermined timing on the basis of the above-described basic operating clock signal, as shown in FIG. 7B or FIG. 7C. Noise (FIG. 7G) accompanying a change in electric power when the basic operating clock signal rises or falls is mixed in the analog signal from the CCD image sensor 14 (CCD output).

However, since the frequency of the basic operating clock signal is reduced to increase the half period of the clock signal, noise attenuates sufficiently during the half period and a certain time period exists in which no noise is mixed in the CCD output. The phases of the sampling pulses DS1 and DS2 supplied to the CDS circuit 18A (FIG. 4) are adjusted in correspondence with the above-described time period during which no noise is mixed in the CCD output, thereby preventing mixing of noise in the signal sampled by correlation double sampling using these sampling pulses DS1 and DS2. The phases of the sampling pulses DS1 and DS2 are adjusted to be optimized before shipping of the electronic camera.

Figure 8:
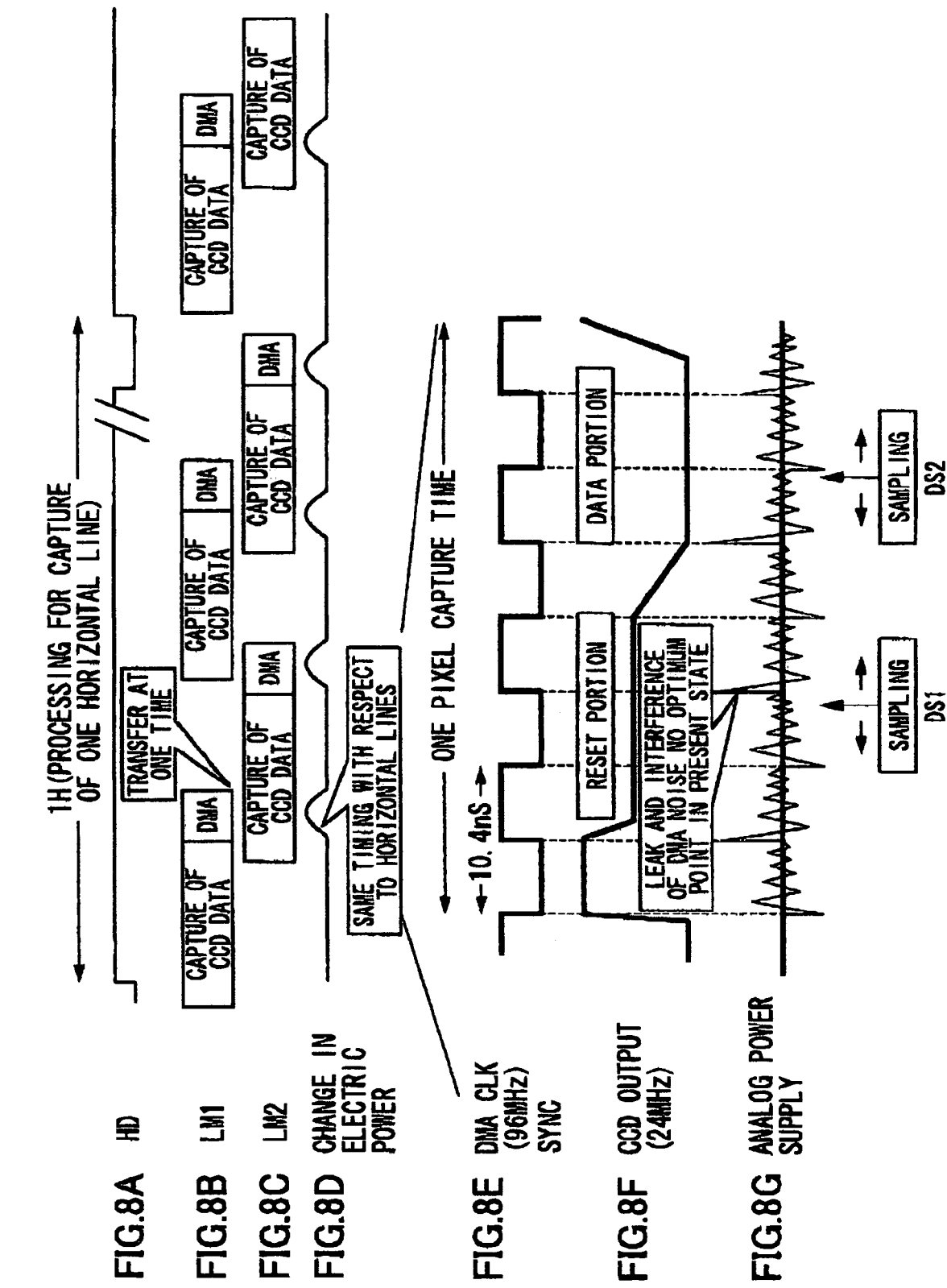
FIGS. 8A to 8G are timing charts showing signal waveforms in the various sections at the time of processing for capturing the CCD output in a state where the frequency of the basic operating clock signal is high.

If the basic operating clock signal is maintained at the higher frequency (96 MHz) as shown in FIG. 8E, noise (FIG. 8G) accompanying a change in electric power when the basic operating clock signal rises or falls does not attenuate sufficiently during the half period of the basic operating clock signal and is mixed in the CCD output at all times. That is, even if the phases of the sampling pulses supplied to the CDS circuit 18A are adjusted, noise is mixed in the signal sampled by correlation double sampling in the CDS circuit 18A (i.e., the signal sampled during DMA transfer) since no time period exists in which no noise is mixed in the CCD output.

In the above-described embodiment, the frequency of the basic operating clock signal is reduced at the time of AD conversion of the still image output from the CCD image sensor 14. However, the basic operating clock signal may be maintained at the higher frequency under particular conditions in embodiments described below.

Figure 9:
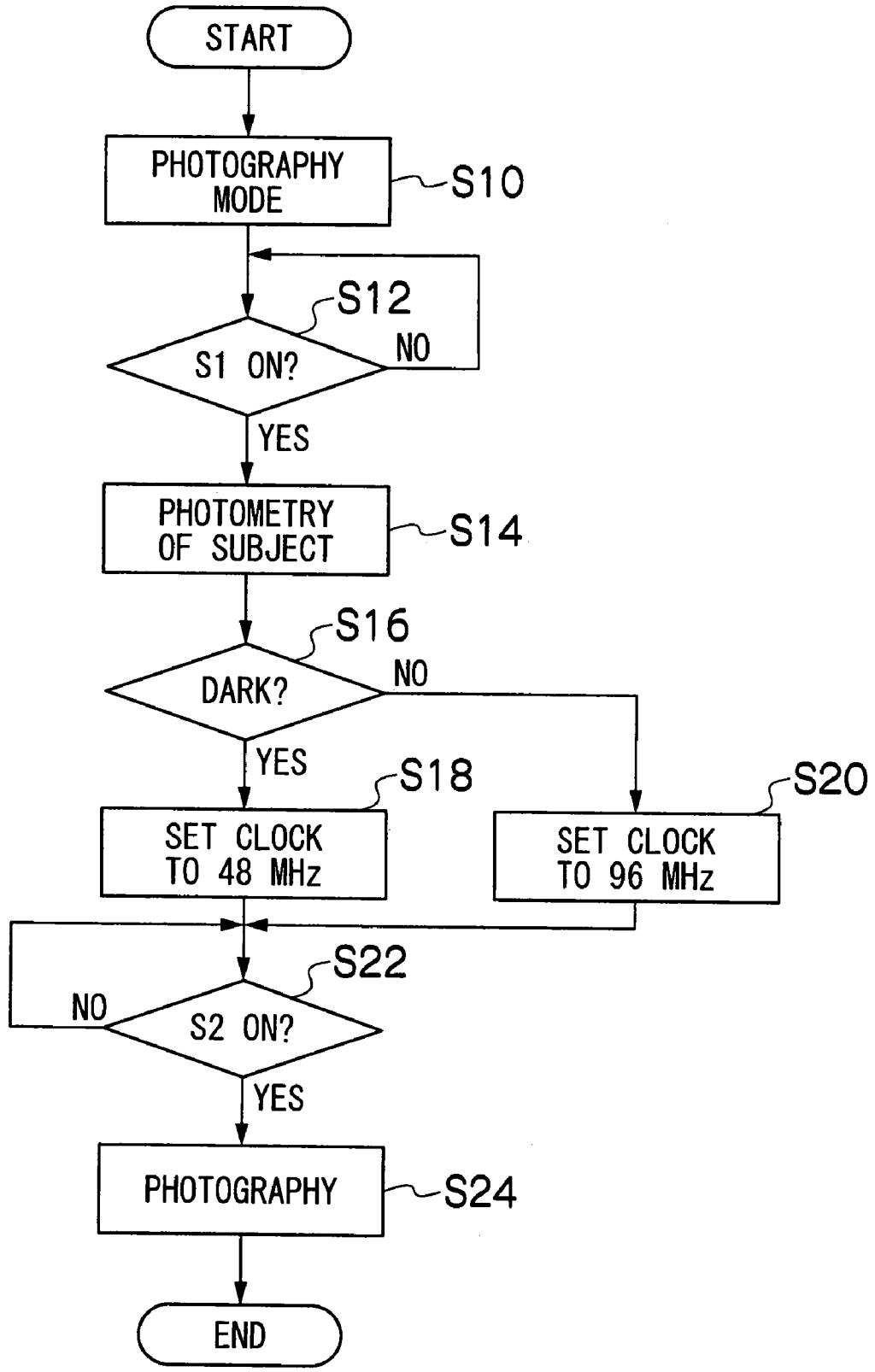
FIG. 9 is a flowchart of a first embodiment of details of processing during still image photography including control of change of the frequency of the basic operating clock signal.

FIG. 9 is a flowchart showing a first embodiment of details of processing during still image photography including control of change of the frequency of the basic operating clock signal.

When one of the photography modes is selected by the photography mode/reproduction mode selecting lever 6 (step S10), determination is made as to whether or not the shutter button 2 has been half-pressed (switch S1 has been turned on) (step S12).

When the switch S1 is turned on, the subject brightness is measured for exposure control at the time of still image photography (step S14). In this step S14, average photometry for obtaining the average of brightness of the entire frame on the basis of the CCD output from the CCD image sensor 14 or spot photometry such that the exposure at a center of the frame is optimized is performed. The measurement of the subject brightness is not limited to the measurement on the basis of the CCD output from the CCD image sensor 14. The subject brightness may be measured by using some other photometry sensor.

Subsequently, determination is made as to whether or not the subject is dark on the basis of the photometry value obtained in step S14. Determination as to whether or not the subject is dark is made, for example, with reference to a level of brightness of the subject at which the CCD output is so small that gain control at a subsequent stage is required.

If it is determined that the subject is dark, the frequency of the basic operating clock signal is set to 48 MHz (step S18). If it is determined that the subject is bright, the frequency of the basic operating clock signal is set to 96 MHz (step S20).

Thereafter, determination is made as to whether or not the shutter button 2 has been fully pressed (switch S2 has been turned on) (step S22). When the switch S2 is turned on, photography of a still image is performed (step S24). The frequency of the basic operating clock signal during the time period for reading the CCD output from the CCD image sensor 14 in this still image photography is selected as the frequency set in the above-described step S18 or S20 on the basis of the brightness of the object.

That is, noise mixed in the CCD output from the CCD image sensor 14 is considerably large when the CCD output level is low (when the brightness of the subject is low). In this embodiment, the frequency of the basic operating clock signal is reduced only in the case of photography of a dark subject.

Figure 10:
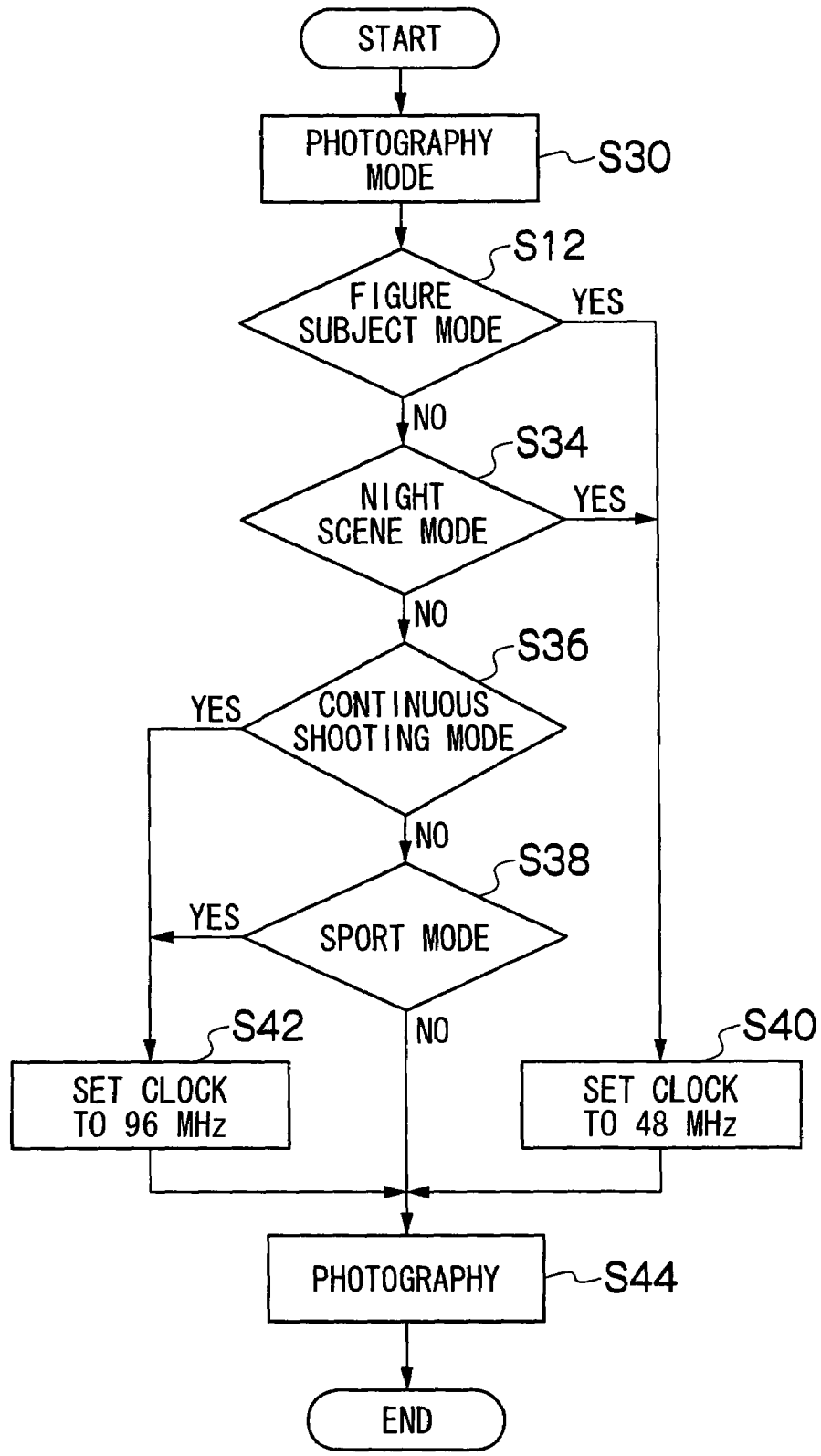
FIG. 10 is a flowchart of a second embodiment of details of processing during still image photography including control of change of the frequency of the basic operating clock signal.

FIG. 10 is a flowchart showing a second embodiment of details of processing during still image photography including control of change of the frequency of the basic operating clock signal.

When one of photography modes is selected by the photography mode/reproduction mode selecting lever 6 (step S30), determination is made as to whether the photography mode selected by the mode dial 1 is the figure subject mode, the night scene mode or the continuous shooting mode or whether a sport mode is selected through the menu display or the like in the manual photography mode (steps S32, S34, S36, S38).

If the figure subject mode or the night scene mode has been selected, the frequency of the basic operating clock signal is set to 48 MHz (step S40). If the continuous shooting mode or the sport mode has been selected, the frequency of the basic operating clock signal is set to 96 MHz (step S42).

Thereafter, when the shutter button 2 is fully pressed, still image photography is performed (step S44). The frequency of the basic operating clock signal during the time period for reading the CCD output from the CCD image sensor 14 in this still image photography is selected as the frequency set in the above-described step S40 or S42 on the basis of the photography mode.

That is, this is because the figure subject mode is ordinarily selected at the time of photography in a room and the night scene mode is selected in the nighttime, and because the subject is supposed to be dark in such a situation. Also, the reason for maintaining the basic operating clock signal at the higher frequency when the continuous shooting mode is selected is that high-speed digital processing is performed with priority at the time of continuous shooting. The reason for maintaining the basic operating clock signal at the higher frequency when the sport mode is selected is that a high shutter speed is ordinarily set for photography of a bright subject in the sport mode. The photography mode on which selection of the frequency of the basic operating clock signal is based is not limited to those in this embodiment.

Figure 11:
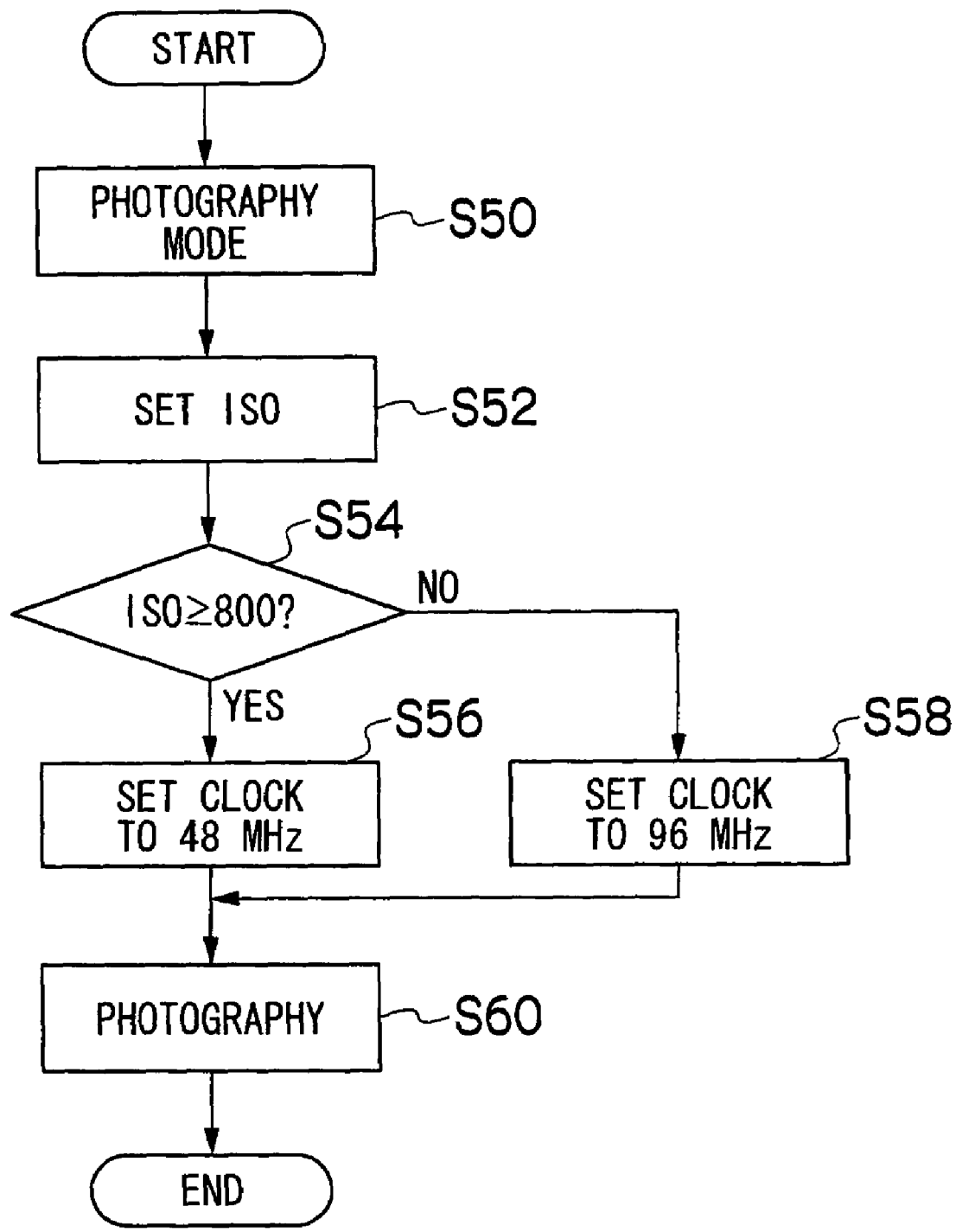
FIG. 11 is a flowchart of a third embodiment of details of processing during still image photography including control of change of the frequency of the basic operating clock signal.
Figure 12:
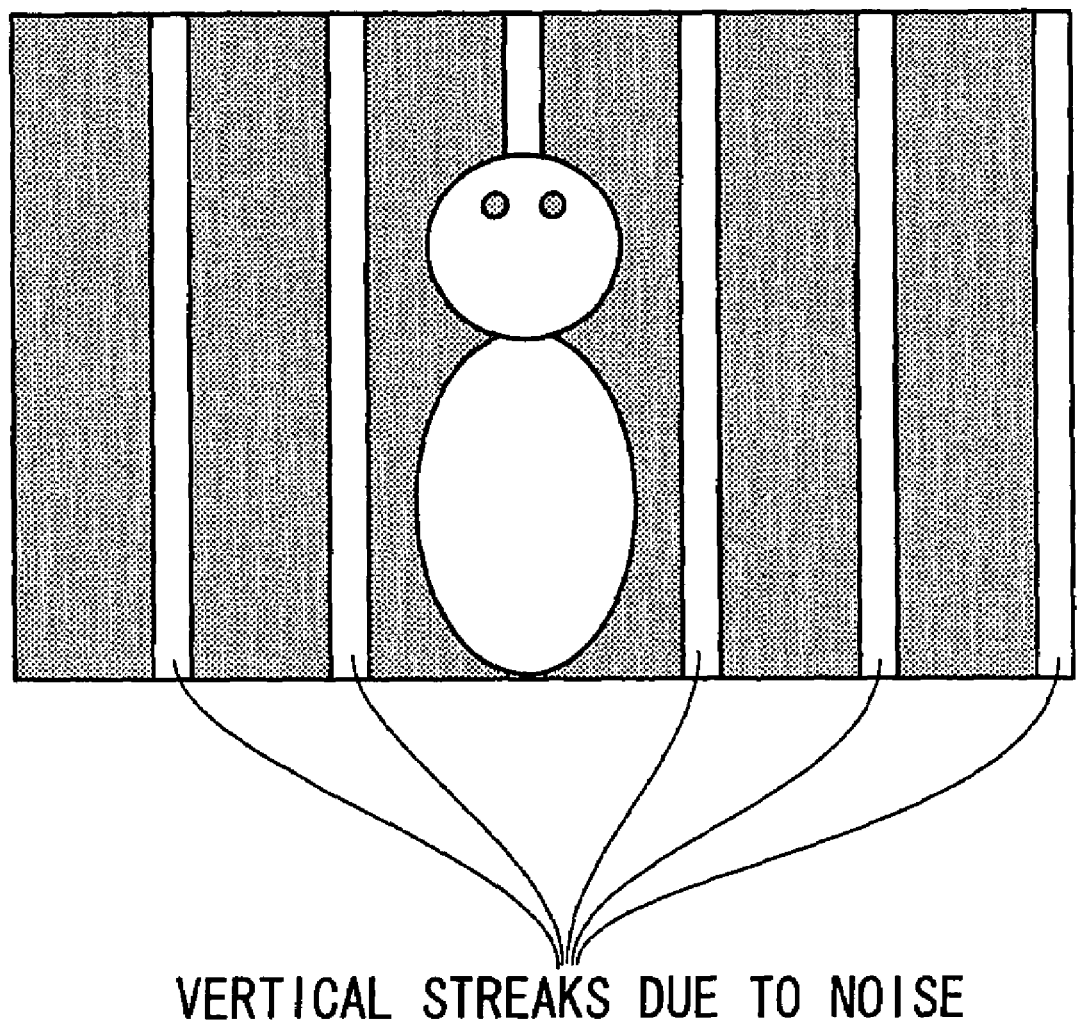
FIG. 12 is a diagram showing an image when noise accompanying DMA transfer is mixed in an analog signal in the case of the conventional art.

FIG. 11 is a flowchart showing a third embodiment of details of processing during still image photography including control of change of the frequency of the basic operating clock signal.

When one of photography modes is selected by the photography mode/reproduction mode selecting lever 6 (step S50), an ISO speed set in advance is read (step S52). The ISO speed may be set in such a manner that a user selects one of ISO speeds: 100, 200, 400, 1600 by using the menus display, or may be automatically set in the camera.

Subsequently, determination is made as to whether the set ISO speed is ISO$\geqq$800 (step S54). If the ISO speed is equal to or higher than 800, the frequency of the basic operating clock signal is set to 48 MHz (step S56). If the ISO speed is lower than 800, the frequency of the basic operating clock signal is set to 96 MHz (step S58).

Thereafter, when the shutter button 2 is fully pressed, still image photography is performed (step S60). The frequency of the basic operating clock signal during the time period for reading the CCD output from the CCD image sensor 14 in this still image photography is selected as the frequency set in the above-described step S56 or S58 on the basis of the ISO speed. When the ISO speed is equal to or higher than ISO 800, the frequency of the basic operating clock signal is reduced to prevent mixing of noise or reduce the amount of noise mixed in a still image in the high speed mode in which noise is easily visually recognizable.

Preferably, the phases of sampling clock pulses DS1 and DS2 for sampling the CCD output are changed by being optimized so that the influence of noise is eliminated or reduced with respect to each of the lower frequency to which the frequency of the basic operating clock signal is reduced at the time of still image output and the higher frequency at which the basic operating clock signal is maintained at the time of still image output (see FIG. 7G and FIG. 8G).

In a case where moving picture taking is performed by using an electronic camera having a moving picture taking function, the frequency of the basic operating clock at the time of A/D conversion of the CCD output is maintained at the higher frequency. This is because noise is not easily recognizable in a moving picture and because moving picture digital processing is performed with priority.

What is claimed is:

1. An electronic camera in which an analog signal output from an image pickup device is analog-to-digital-converted (AD-converted) and digital processing is performed on the AD-converted signal on the basis of a basic operating clock, said camera comprising:
a clock change device for changing a frequency of the basic operating clock;
a control device for controlling the clock change device such that the frequency of the basic operating clock is reduced at the time of AD conversion of a still image output from the image pickup device; and
a photography mode selecting device for selecting a desired photography mode from a plurality of photography modes,
wherein said control device controls the clock change device such that the frequency of the basic operating clock is reduced only when a particular one of the photography modes is selected by said photography mode selecting device.

2. The electronic camera according to claim 1, further comprising:
a photometry device for measuring the brightness of a subject,
wherein said control device controls the clock change device such that the frequency of the basic operating clock is reduced when it is determined that the brightness of the subject measured by said photometry device is lower than a predetermined brightness.

3. The electronic camera according to claim 1, further comprising:
an International Standards Organization (ISO) speed setting device for setting an ISO speed,
wherein said control device controls the clock change device such that the frequency of the basic operating clock is reduced when the ISO speed set by said ISO speed setting device is equal to or higher than a predetermined value.

4. The electronic camera according to claim 1, further comprising:
first and second line memories in which the AD-converted digital signal is alternately stored in a predetermined data amount, and a random access memory (RAM) for temporarily storing the digital signal at least for one frame of a still image,
wherein, when capture of the digital signal in said first line memory is completed, the captured digital signal is direct memory access-transferred (DMA-transferred) to said RAM on the basis of the basic operating clock, and
wherein, when capture of the digital signal in said second line memory is completed, the captured digital signal is DMA-transferred to said RAM on the basis of the basic operating clock signal.

5. The electronic camera according to claim 1, further comprising:
an analog front end (AFE) which receives said analog signal output from an image pickup device, and comprises an analog-to-digital converter (A/D converter) which outputs said AD-converted signal.

6. The electronic camera according to claim 5, further comprising:

a charge coupled device (CCD) image sensor which supplies said analog signal to said AFE; and
a clock generation circuit which supplies an AD clock signal to said A/D converter and said CCD image sensor.

7. The electronic camera according to claim 6, wherein said analog front end further comprises:
a correlation double sampling (CDS) circuit which receives said analog signal, and performs correlation double sampling on said analog signal;
a gain control amplifier (GCA) which controls a gain of a signal output from said CDS circuit, said A/D converter receiving said gain-controlled signal.

8. The electronic camera according to claim 7, wherein said control device comprises a signal processor including plural line memories which alternately capture said AD-converted signal output from said AFE.

9. The electronic camera according to claim 8, wherein said clock generation circuit supplies said basic operating clock to said signal processor which processes said AD-converted signal based on said basic operating clock.

10. The electronic camera according to claim 8, wherein said clock generation circuit comprises a frequency divider for dividing a frequency of said basic operating clock.

11. The electronic camera according to claim 8, wherein said clock change device comprises a clock change switch of said clock generation circuit,
wherein said signal processor supplies a clock change control signal to said clock change switch for causing a lever of said clock change switch to connect to a contact for supplying said basic operating clock to said frequency divider.

12. The electronic camera according to claim 8, wherein said signal processor controls said frequency of said basic operating clock.

13. The electronic camera according to claim 8, wherein said signal processor performs digital processing on the basis of said basic operating clock signal supplied from the clock signal generation circuit.

14. The electronic camera according to claim 8, further comprising:
a random access memory (RAM) coupled to said signal processor, said plural line memories serving as a queue for a digital signal waiting to be direct memory access-transferred (DMA-transferred) to said RAM.

15. The electronic camera according to claim 1, wherein said control device controls the clock change device such that the frequency of the basic operating clock is not reduced at a time which is other than the time of AD conversion of said still image.

16. A signal processing circuit for an electronic camera including an image pickup device, said circuit comprising:
a clock change device for changing a frequency of a basic operating clock;
a control device for controlling the clock change device such that the frequency of the basic operating clock is reduced at a time of AD conversion of a still image output from said image pickup device; and
a photography mode selecting device for selecting a desired photography mode from a plurality of photography modes,
wherein said control device controls the clock change device such that the frequency of the basic operating clock is reduced only when a particular one of the photography modes is selected by said photography mode selecting device.

17. A method of processing an image data signal in an electronic camera including an image pickup device, comprising:

changing a frequency of a basic operating clock by using a clock change device;

controlling the clock change device such that the frequency of the basic operating clock is reduced at a time of AD conversion of a still image output from said image pickup device; and selecting desired photography mode from a plurality of photography modes by using a photography mode selecting device, wherein said controlling said clock change device comprises controlling the clock change device such that the frequency of the basic operating clock is reduced only when a particular one of the photography modes is selected by said photography mode selecting device.

* * * * *